June 30, 1953  L. W. RUST, SR  2,643,785
VACUUM NURSING BOTTLE
Filed Oct. 24, 1950

INVENTOR.
L. W. RUST, SR.
BY
A. Yates Dowell
ATTORNEY

Patented June 30, 1953

2,643,785

UNITED STATES PATENT OFFICE 2,643,785

VACUUM NURSING BOTTLE

Leonard Wood Rust, Sr., Hopewell, Va.

Application October 24, 1950, Serial No. 191,839

1 Claim. (Cl. 215—11)

This invention relates to vacuum bottles and more particularly to a vacuum bottle adapted for use with a nipple of the type commonly used for nursing infants.

The problem of providing an infant with milk of the proper temperature at a designated time has long been with us. Various means of heating bottles have been provided, but these have entailed the necessary expense for the heating means and have been inconvenient due to the time required for their use. The general idea of carrying an infant's milk in a vacuum bottle has been used heretofore but a structure which is readily adaptable to conventional nipples as now are available on the market has not found ready acceptance.

Accordingly, it is an object of the present invention to provide a vacuum nursing bottle assembly including a nipple and suitable retaining means therefor which is easy to use and by means of which the parent can conveniently carry the bottle and the protected nipple and readily change the nipple to the position for use by the infant.

A further object of the invention is to provide an adapter for a conventional vacuum bottle which is easy to install and by means of which a conventional nipple may be used.

Figure 2:
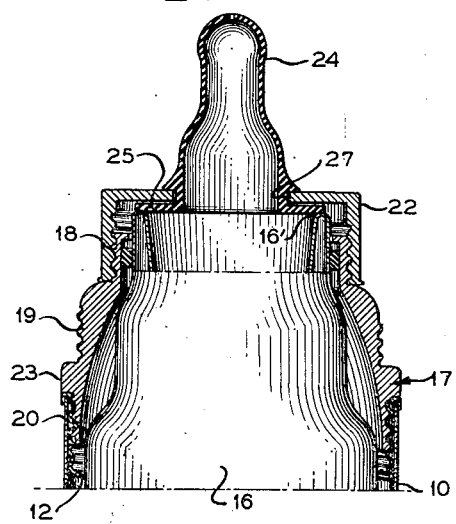
Figure 1:
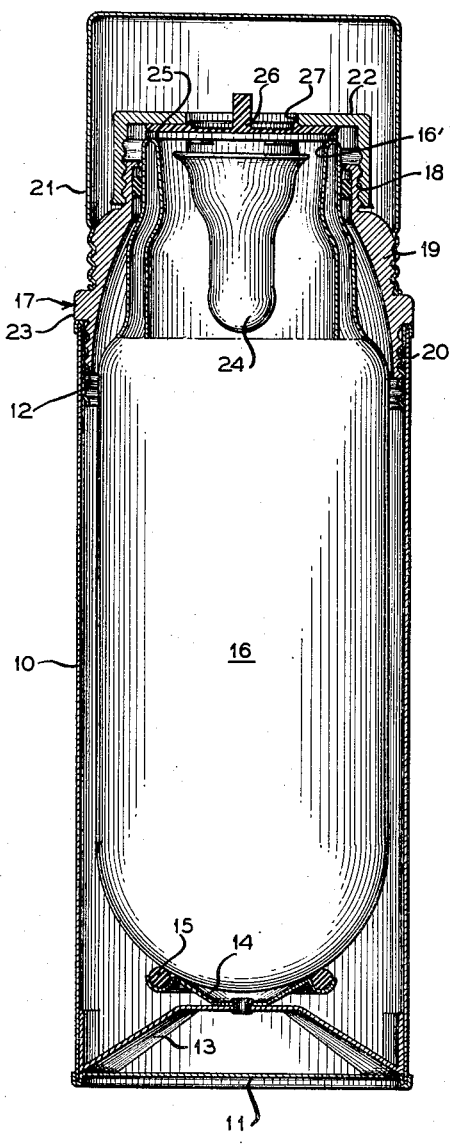
Figure 3:
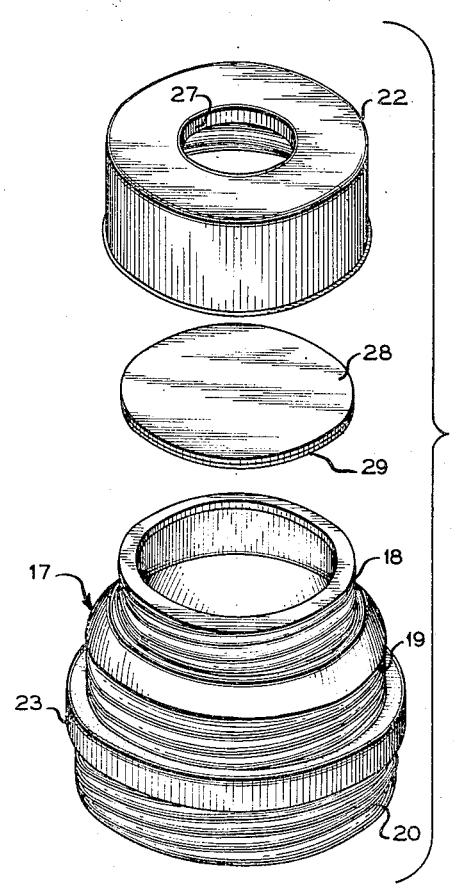

These and other objects of the invention will become apparent from the following description considered with the accompanying drawing, in which:

Fig. 1 is a longitudinal section showing the adapter of the present invention in use in a conventional vacuum bottle assembly;

Fig. 2, a section through the upper portion of the device of Fig. 1 showing the nipple in position for use and with the unnecessary parts removed; and Fig. 3, an exploded view showing the parts of the adapter.

Referring to the drawings, a vacuum nursing bottle assembly is shown which comprises an outer cylindrical casing 10 closed at one end by a bottom 11 and has internal threads 12 at its open end. Disposed within the bottom of the receptacle is a spacing strut member 13 which carries a supporting frusto-conical member 14 on the rim of which a resilient ring 15 of rubber or the like is provided. The ring 15 supports a double wall receptacle or bottle 16 spaced from the bottom of the outer receptacle or casing 10 and from its side walls.

Received within the upper open end of the casing 10 is an adapter member 17. The adapter comprises first, second and third substantially cylindrical sections 18, 19 and 20, the first section being of smaller diameter than the second and third, and the second being of smaller diameter than the third. The sections are provided with external threads, the threads of the third section being adapted to engage the internal threads of the upper open end of the casing 10. The threads of the second section 19 are provided to engage the inner threads of a conventional cup-type cap 21 and the threads of the first section are adapted to engage the internal threads of a cap 22. A flange 23 is preferably provided separating the second and third sections 19 and 20 from each other and engaging the edge of the open end of the casing 10 when the adapter is fully inserted.

The mouth 16' of the vacuum bottle is adapted to receive a nipple 24 having a flange portion 25 at its base. When used in the storage or carrying position as shown in Fig. 1 the nipple is received within the receptacle 16 and the flange is held against the mouth 16' of the vacuum bottle by a closure member 26 which is held against the flange of the nipple by the cap 22, the cap being provided with an aperture 27 for the reception of the nipple 24 when it is in the position to be used by the infant, as shown in Fig. 2.

When it is desired to place the nipple in position for use the cap 22 and the cap closure 26 are removed, the nipple placed through the aperture 27 of the cap 22, and the cap threadedly engaged with the section 18 of the adapter in which position the flange of the nipple is securely retained between the cap and the mouth 16' of the vacuum bottle.

Instead of using a cap closure member of the conventional type, as illustrated in Fig. 1 by the numeral 26, the invention contemplates the employment of a flat disc member 28 which may be used with the adapter and cap. When member 28 is employed the nipple may be carried as shown in Fig. 1, or the bottle may be used without the nipple for conventional purposes and without presenting the appearance of a child's nursing bottle. Disc 28 may be of metal, but more preferably is of a low heat conducting character such as certain plastics or the like and may be provided with a sealing ring 29, for use without a nipple.

It will be appreciated that the present invention offers numerous advantages. For example, when the nipple is carried within the bottle, as shown in Fig. 1, the air space within the nipple provides effective insulation against the transfer of heat from the milk or other liquid carried within the receptacle 16 to the outside. This is true whether the outside cap 21 is employed or not. In other words, the cap 21 may be entirely dispensed with and the temperature retaining qualities of the device are not impaired.

Also, the cap 22, may be made a solid structure, by eliminating the opening 27, thereby providing a more attractive cap. The sealing ring 29, on the disc 28, contacts the mouth 16' of the receptacle 16, when urged downwardly by the said cap 22 utilizing only the outer perimeter thereof.

The invention contemplates that the adapter assembly shown in Fig. 3 may be put up and sold separately for use with conventional vacuum bottle structure and conventional nipples having a flange at the base in order that the user may merely purchase the adapter assembly and thus convert his conventional vacuum bottle to one adapted for carrying the baby's milk. Furthermore, the adapter does not reduce the utility of the vacuum bottle for use other than carrying milk for the baby.

It will be apparent that the present invention is not limited to the specific embodiment shown in the drawings and described in the specification but that reasonable variation thereof is within the scope of the invention.

What is claimed is:

A vacuum nursing bottle comprising an outer cylindrical casing closed at one end and internally threaded at the other, a double wall vacuum receptacle open at one end and adapted to be received in the casing, and an adapter for holding the receptacle in the casing, said adapter comprising first, second and third substantially cylindrical externally threaded connected sections, said first section being adapted to engage the internally threaded end of the casing, a flange separating the second section from the first, the third section being of smaller diameter than the second, the open end of the said receptacle projecting beyond said adapter, a first internally threaded cap having a central aperture and adapted to engage the third section, a flanged nipple being adapted to be selectively assembled to extend through said aperture in said first cap or to extend into said receptacle, its flange being clamped directly between said cap and the mouth of said receptacle, and a second internally threaded cap adapted to engage the second section and cover the first cap and third section, said second cap abutting the first named flange when completely engaged with said second section.

LEONARD WOOD RUST, Sr.

References Cited in the file of this patent

UNITED STATES PATENTS

| Number | Name | Date |
|---|---|---|
| 1,749,432 | Kriege | Mar. 4, 1930 |
| 1,855,039 | Wetmore | Apr. 19, 1932 |
| 2,093,130 | Kurkjian | Sept. 14, 1937 |
| 2,096,961 | Condon | Oct. 26, 1937 |
| 2,324,253 | Anderson | July 13, 1943 |
| 2,480,247 | Jamison et al. | Aug. 30, 1949 |

FOREIGN PATENTS

| Number | Country | Date |
|---|---|---|
| 498,661 | Great Britain | Jan. 11, 1939 |